Figure 1:
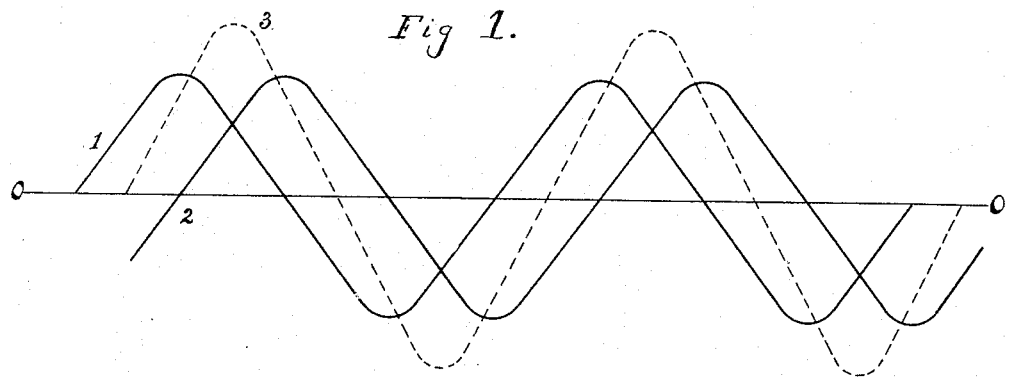

(No Model.) 2 Sheets—Sheet 1.
O. B. SHALLENBERGER.
SYSTEM OF DISTRIBUTION BY ALTERNATING ELECTRIC CURRENTS.
No. 412,932. Patented Oct. 15, 1889.

WITNESSES:
INVENTOR
Oliver B. Shallenberger
BY
Pope, Edgecomb & Terry
ATTORNEYS.

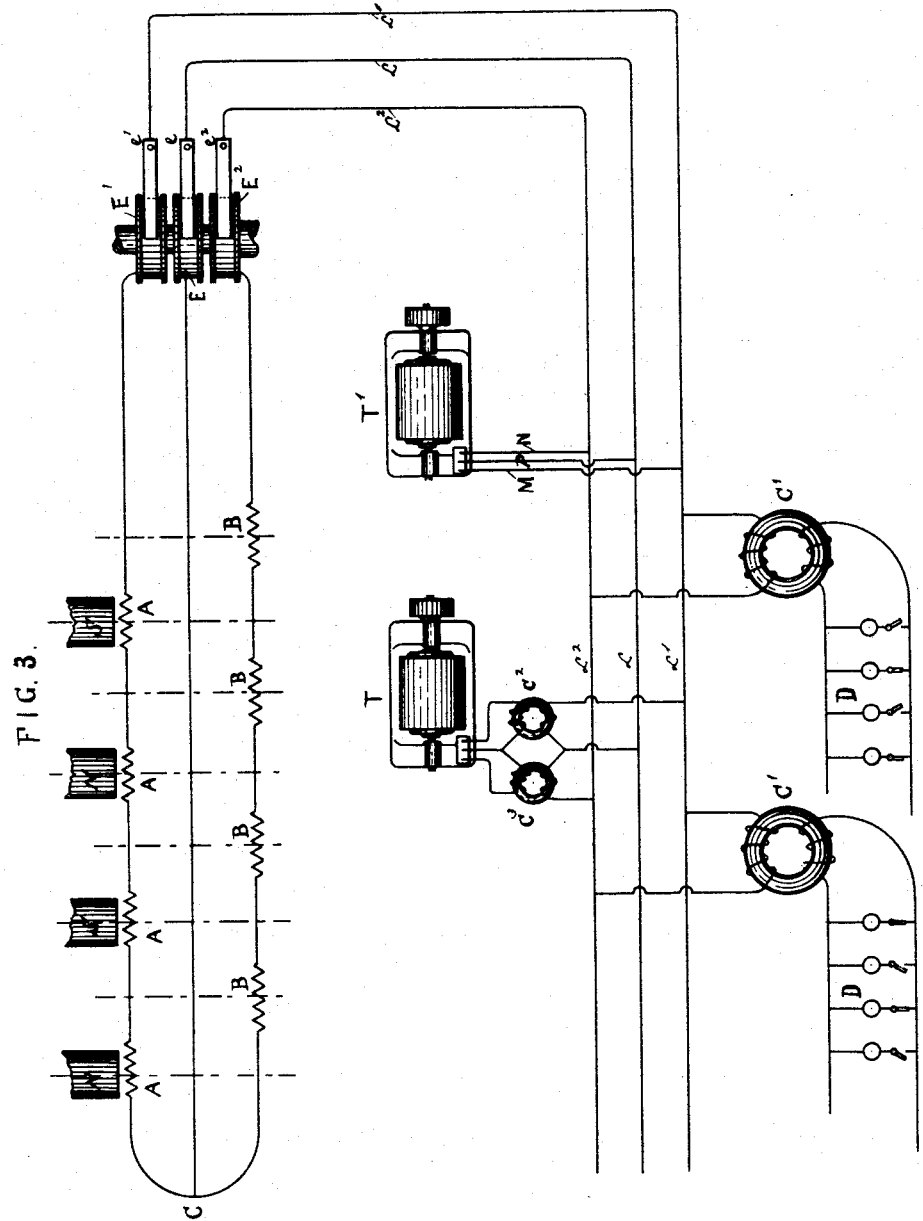

UNITED STATES PATENT OFFICE.

OLIVER B. SHALLENBERGER, OF ROCHESTER, ASSIGNOR TO THE WESTINGHOUSE ELECTRIC COMPANY, OF PITTSBURG, PENNSYLVANIA.

SYSTEM OF DISTRIBUTION BY ALTERNATING ELECTRIC CURRENTS.

SPECIFICATION forming part of Letters Patent No. 412,932, dated October 15, 1889.

Application filed August 25, 1888. Serial No. 283,763. (No model.)

*To all whom it may concern:*

Be it known that I, OLIVER B. SHALLENBERGER, a citizen of the United States, residing in Rochester, Beaver county, in the State of Pennsylvania, have invented certain new and useful Improvements in the System of Distribution by Alternating Electric Currents, (Case 225,) of which the following is a specification.

My invention relates to the distribution of alternating electric currents for the transmission of energy, and refers more particularly to that class of distribution in which it is necessary to have two or more alternating currents whose periods of alternation are not coincident with each other and must therefore be provided with distinct circuits in order to retain this relation in the alternations.

The method and organization employed in this invention are applicable especially to electric motors having two separate windings which are to be supplied with alternating, intermittent, or pulsatory currents, in which the difference of phase between the currents upon two circuits is one-quarter period. This relation may, however, be considerably modified without departing from the principle involved. It has been proposed, in the operation of such motors, to employ either two distinct circuits leading from separate windings of the generator or to combine these circuits so as to have a common return-conductor, the motor-circuits being supplied from two branches so obtained. When incandescent lamps or other translating devices are also to be operated, they are equally divided between the two branches, thus maintaining an approximately-equal current in each. The difficulty of applying this method to existing plants for the distribution of electric energy lies in the fact that it is necessary to separate the circuits into two approximately-equal parts and rearrange the wiring in such a manner that the circuits may be separately supplied independently of each other.

I have discovered that it is possible to produce in a given circuit a single alternating current by the superposition of two alternating currents differing from each other in the time of their phases, which will not be materially different in effect for ordinary lighting purposes from that heretofore employed, and by deriving from an intermediate point in the generating-circuit a third conductor it is possible to obtain two currents having any required difference of phase and cause them to traverse the two independent circuits thus formed. These currents may be employed for operating the motors.

Figure 2:
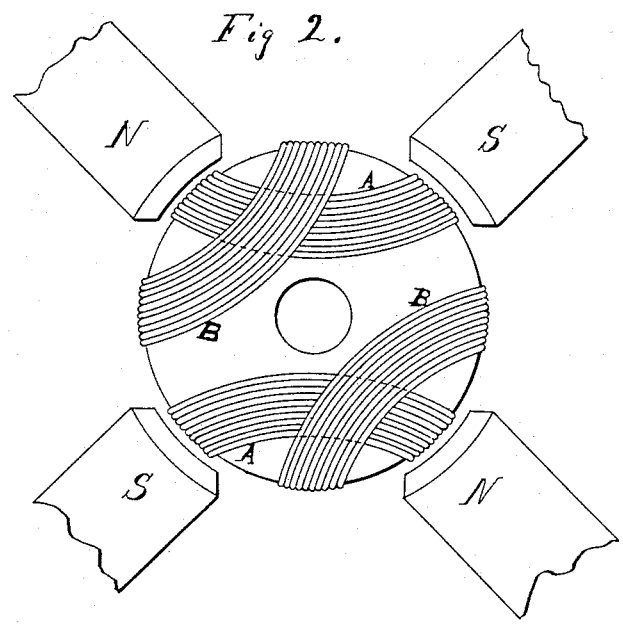

In the accompanying drawings, Figure 1 is a theoretical diagram illustrating the superposition of currents. Fig. 2 is a theoretical diagram of the organization of the generating-circuit. Fig. 3 illustrates the organization of the generating and distributing circuits.

Referring to Fig. 1, let it be supposed that two alternating currents (represented by the full lines 1 and 2) passing alternately above and below the normal $o$ are caused to pass over the same conductor, and have, in the case shown, a difference of phase of one-quarter period. The resultant alternating current will then be represented by the dotted lines 3, having maximum points at such times as the sum of the currents 1 and 2 is greatest in one direction, and passing through zero values at such times as these currents are equal and opposite. It is evident that a composite current so formed is capable of producing all the effects in transformers and other alternating-current apparatus that can be obtained by means of a simple alternating current, while at the same time the connections may be such as to utilize independently the two currents of different phases for the operation of a motor or other apparatus.

Fig. 2 shows in diagram an armature wound to produce such currents as shown in Fig. 1, the coils being so placed that the current produced in the coils A A is at a maximum when that in the coils B B is at a minimum. The relative positions of these coils are indicated diagrammatically in Fig. 3, the coils A A being intermediate between the coils B B, so that while the coils A are traversing the lines of force due to the poles N S at a maximum rate the coils B are in a neutral position, and consequently are producing no current, and vice versa. If, now, the two sets of coils be connected in series at the point C and their free terminals connected, respectively, with the insulated collector-rings $E'$ and $E^2$ of the generator in exactly the same way as in an ordinary type of alternate-current generator, alternating currents may be derived from the rings E' and E² through brushes e' and e², which are respectively connected with the lines L' and L². Translating devices may then be connected across the circuit thus formed. The devices D are here shown as connected in the secondary circuits of the converters C' C', which have their primary coils connected between the lines L' L².

When it is desired to operate motors from the same machine, it is only necessary to connect the point C to the collector-ring E and lead from its brush e a third line L and introduce the motors T upon the circuit, as shown in Fig. 3. For this purpose two converters C² C³ may be connected across the circuit L' L² in series, while the third conductor L is connected between the two converters. Currents will now be delivered over the pair of conductors L L' independently of those carried over L L², the conductor L operating simply as a common return for the two currents so delivered. In certain cases the transformers may be omitted and the connections made directly to the motor T', as shown at M N P. By this method of connecting the circuits it is only necessary to connect the collector-ring E to a conductor used for operating the motor-circuits without in any way interfering with such existing circuits for lighting purposes as may be supplied by the main conductors L' L². The current delivered over the conductors L' L², considered separately, is due to the resultant action of the two windings of the armature, while that delivered over the lines L L' and L L² is due to their independent action, and may be made to differ by a quarter-period, or such other amount as found necessary or convenient in practice.

In another application of even date herewith, Serial No. 283,764, the method herein set forth is claimed.

I claim as my invention—

1. The combination of an alternating-current generator having armature-coils producing currents differing in phase and connected in series, translating devices connected across the extremities of these coils, and motor-circuits derived, respectively, from the portions of the winding included between the extremities and a point intermediate thereto.

2. The combination, with an alternating-current generator adapted to deliver two currents differing in phase, of translating devices deriving currents due to their resultant action and other translating devices deriving currents due to their independent action.

3. The combination of two sources of alternating electric currents of non-synchronous phases, a circuit in which said sources are connected in series, a conductor leading from a point in the circuit between said sources, translating devices connected in series with the two sources, and electrical devices connected in series with each of the respective sources.

In testimony whereof I have hereunto subscribed my name this 17th day of August, A. D. 1888.

OLIVER B. SHALLENBERGER.

Witnesses:
C. C. WOLFE,
CHARLES A. TERRY.